(12) United States Patent  
Tholl et al.

(10) Patent No.: US 7,787,016 B2  
(45) Date of Patent: Aug. 31, 2010

(54) IMAGING DEVICE FOR THE STABILIZED IMAGING OF AN OBJECT ONTO A DETECTOR

(75) Inventors: Hans Dieter Tholl, Uhldingen (DE); Dirk Krogmann, Uhldingen (DE)

(73) Assignee: Bodenseewerk Gerätetechnik GmbH, Überlingen (DE)

( * ) Notice: Subject to any disclaimer, the term of this patent is extended or adjusted under 35 U.S.C. 154(b) by 1066 days.

(21) Appl. No.: 11/004,769

(22) Filed: Dec. 3, 2004

(65) Prior Publication Data

US 2005/0128308 A1  Jun. 16, 2005

(30) Foreign Application Priority Data

Dec. 6, 2003 (DE) ................. 103 57 132

(51) Int. Cl.  
*H04N 5/228* (2006.01)

(52) U.S. Cl. ................. 348/208.11

(58) Field of Classification Search ........... 348/208.99, 348/208.4, 208.5, 208.7, 208.11  
See application file for complete search history.

(56) References Cited

U.S. PATENT DOCUMENTS

| | | | |
|---|---|---|---|
| 5,812,322 A * | 9/1998 | Meyers .............. | 359/621 |
| 5,909,308 A | 6/1999 | Ulrich | |
| 6,005,721 A | 12/1999 | Baumann et al. | |
| 6,122,108 A | 9/2000 | Tholl et al. | |
| 6,226,459 B1 | 5/2001 | Hamada et al. | |
| 6,985,176 B2 * | 1/2006 | Noguchi .............. | 348/208.11 |
| 2002/0140835 A1 * | 10/2002 | Silverstein ........... | 348/340 |

FOREIGN PATENT DOCUMENTS

| | | |
|---|---|---|
| EP | 1 460 456 A1 | 9/2004 |
| GB | 2 330 215 A | 4/1999 |
| JP | 06-043517 | 2/1994 |

* cited by examiner

*Primary Examiner*—Jason Chan  
*Assistant Examiner*—Nicholas G Giles  
(74) *Attorney, Agent, or Firm*—Scully, Scott, Murphy & Presser, P.C.

(57) ABSTRACT

An imaging device (2) for the stabilized imaging of an object onto a detector (14) with a first optical unit (4) and a second optical unit (6) and an optical element that is arranged between the optical units (4, 6) and can be moved for the purpose of stabilizing the imaging on the detector (14). For image stabilization in order to compensate for an undesirable wobbling movement of the imaging over the detector (14), the optical element is constituted of a micro-optical lens array (10).

13 Claims, 3 Drawing Sheets

IMAGING DEVICE FOR THE STABILIZED IMAGING OF AN OBJECT ONTO A DETECTOR

BACKGROUND OF THE INVENTION

1. Field of the Invention

The invention is based on an imaging device for the stabilized imaging of an object onto a detector with a first and a second optical unit and an optical element that is arranged between the first and second optical units and can be moved for the purpose of stabilizing the imaging on the detector.

A camera system having a high resolution is particularly sensitive to wobbling of the recorded images. The movement of an imaging of a focused object to an undesirable extent over a detector of the camera system leads to an unsharp recording of the object. This problem exists particularly in a camera system that is guided in a moving machine that is exposed to tremor or carries out a large intrinsic movement, such as, for example, an aeroplane in turbulence or the like.

2. Discussion of the Prior Art

EP 0 783 121 A2 discloses an imaging device with a first and a second optical unit and an optical element that is arranged between the first and second optical units and is mounted in moveable fashion, by means of which the beam path can be altered such that it is possible to counteract an undesirable movement of the imaging over a detector.

SUMMARY OF THE INVENTION

The invention is based on the object of specifying in particular an imaging device and a method for stabilizing an imaging onto a detector which make it possible to achieve a particularly accurate stabilization of an imaging onto a detector.

The object relating to the device is achieved by means of an imaging device of the type mentioned in the introduction in which, according to the invention, the optical element is a micro-optical lens array.

In the case of a micro-optical lens array, a considerable deflection of the beam path, for example of 15°, can be achieved by a slight movement of the micro-optical lens array, for example in the region of a few μm. A movement of the micro-optical lens array that is necessary for stabilizing an imaging onto a detector can therefore be kept small, thereby enabling the micro-optical lens array to be moved very rapidly. This makes it possible to track the beam path to a wobbling-dictated movement of the imaging over the detector at very high speed and with a very small energy requirement, as a result of which it is possible to achieve a sharp imaging of the focused object onto the detector.

A movement of the imaging on the detector caused by wobbling can be counteracted by a countermovement of the imaging. This countermovement for stabilizing the imaging is referred to hereinafter as "shift". In order to produce this shift, the optical element is moved in a targeted manner. This movement for image stabilization is referred to hereinafter as "displacement".

An electronic control unit with the aid of which the optical element can be moved expediently determines the movement of the imaging on the detector caused by wobbling and instigates the shift for image stabilization. The beam path through the optical units is in this case routed such that a calculated wobbling movement of the imaging over the detector is advantageously compensated for by the targeted shift of the imaging. The micro-optical lens array comprises a plurality of identical lenses—arranged next to one another—with a light entry area of less than 1 mm$^2$.

The lens array may be embodied such that it is moveable relative to a grating or a further optical unit. The lens array is expediently moveable relative to a second lens array, the lenses of which are in each case assigned to a number N of detector pixels. It is possible to achieve a deflection of the beam path to a desired extent in conjunction with little scattering of the deflected light, and thus with a high efficiency. The lenses are in each case assigned to a number N, that is to say in each case to one, two or a plurality of detector pixels, the detector pixels expediently being assigned only in each case to a lens of the second lens array in the case of a beam path that is not deflected by the two lens arrays.

A large shift, that is to say a large stabilization movement of the imaging on the detector, in conjunction with relatively little scattering of the deflected light, can be achieved by a movement means, which can be driven with the aid of the control unit, for the defined movement of the optical element out of an intermediate image plane provided by the first optical unit. The movement of the optical element out of an intermediate image plane is referred to hereinafter as "shift-out". The larger the shift-out, that is to say the further away the optical element is from the intermediate image plane, the larger a shift of the imaging over the detector that can be achieved by a displacement of the micro-optical lens array. Consequently, even a large wobbling movement can be counteracted in the case of a large shift-out. By virtue of the arrangement of the optical element outside the intermediate image plane, the object to be imaged is, if appropriate, no longer imaged precisely in the intermediate image plane. In this case, the intermediate image plane is understood to be the plane which would be provided by the first optical unit without the optical element.

The movement means is expediently provided for a movement of the optical element parallel to an optical axis of the first optical unit. This makes it possible to achieve an effective shift-out from the intermediate image plane.

In a further refinement of the invention, the control unit is provided for calculating an operating point of the optical element outside the intermediate image plane. It is possible to counteract a wobbling movement of the imaging of the object over the detector particularly effectively and with low scattered-light losses. As the shift-out of the optical element increases, the scattered-light losses increase, as a result of which the efficiency of the imaging device decreases. A good operating point for executing the displacement movements therefore depends, inter alia, on the extent of the wobbling movement, the speed of the wobbling movement, the brightness of the imaging and the desired image sharpness and intensity. A favourable operating point can be calculated from one or a plurality of these factors.

The control unit is advantageously provided for calculating an operating point from the extent of a wobbling movement of the imaging over the detector. Extensive stabilization of the imaging onto the detector can be achieved in conjunction with a high efficiency, that is to say low scattered-light losses. In this case, the extent of the wobbling movement may be the average magnitude of the wobbling movement over a predetermined time period. The greater this average wobbling movement, determined as length, the further away the operating point expediently is from the intermediate image plane, in order to achieve a maximum stabilization of the imaging with the aid of a displacement of the micro-optical lens array. The extent of the wobbling movement may also be the average or maximum speed of the movement of the imaging over the detector over a predetermined time period. In order to compensate for a rapid movement of the imaging, the micro-optical lens array must perform a large displacement per unit time. If necessary, this displacement can be reduced by correction of the operating point, for example by arranging it further away from the intermediate image plane.

A rapid stabilization movement of the micro-optical lens array can be achieved if the control unit is provided for controlling movement of the optical element into the operating point.

High-quality images of the imaging device can be achieved if the control unit is provided for including a brightness of the imaging in the calculation of the operating point. In the case of relatively dark imagings, a high scattered-light loss has more serious effects on the quality of the detected imaging than in the case of a very bright imaging. Therefore, in the case of a dark imaging, a scattered-light loss is, if appropriate, to be rated higher than an imaging that is not entirely free of wobbling. Taking account of the brightness of the image may therefore lead to a—seen in relative terms—high image quality.

The object directed at the method is achieved by means of a method for stabilizing an imaging of an object that is imaged onto a detector, in which an optical element arranged in an imaging beam path between a first and a second optical unit is caused to effect a first stabilization movement for stabilizing the imaging, in which case, according to the invention, a micro-optical lens array is moved as the optical element for the purpose of stabilization. In the case of a micro-optical lens array, a considerable deflection of the beam path, for example of 15°, can be achieved by a slight movement of the micro-optical lens array, for example in the region of a few μm. This makes it possible to track the beam path to a wobbling-dictated movement of the imaging over the detector at very high speed and with a very small energy requirement.

The optical element is advantageously caused to effect a first stabilization movement for stabilizing the imaging with the aid of an electronic control unit.

BRIEF DESCRIPTION OF THE DRAWINGS

Further advantages emerge from the following description of the drawing. The drawing illustrates an exemplary embodiment of the invention. The drawing, the description and the claims contain numerous features in combination. The person skilled in the art will expediently also consider the features individually and combine them to form practical further combinations.

In the figures.

DESCRIPTION OF THE EXEMPLARY EMBODIMENTS

Figure 1:
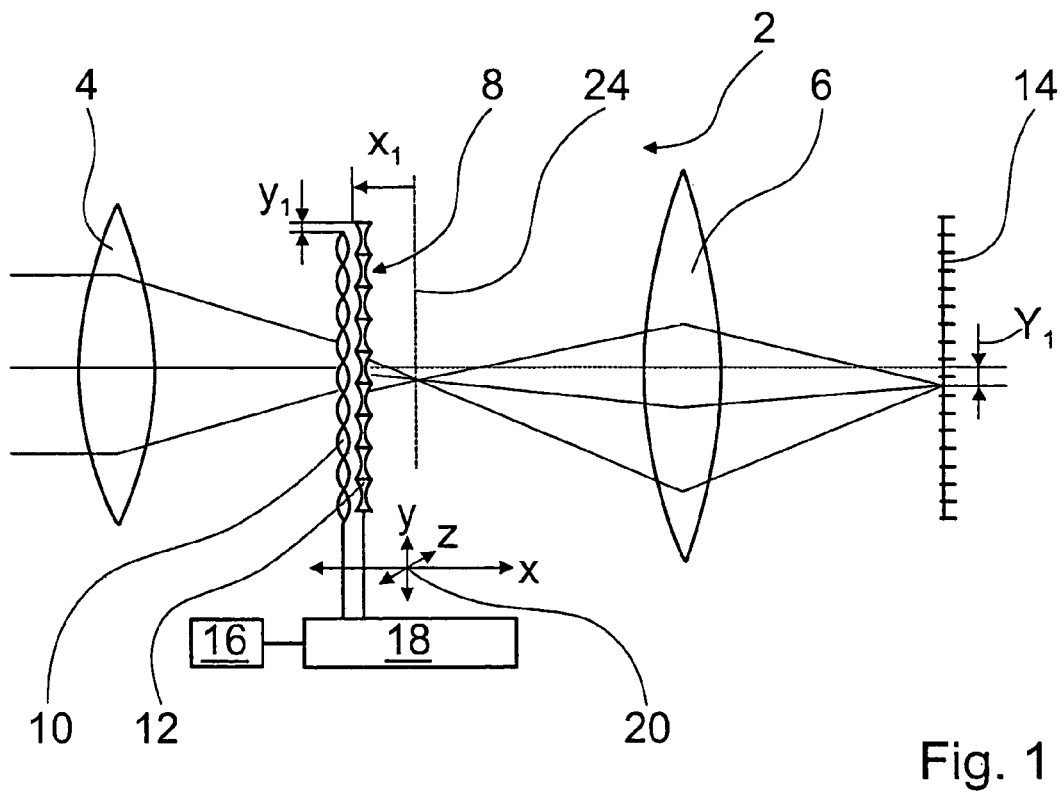
FIG. 1 shows a schematic illustration of an imaging device with an optical element mounted in moveable fashion.

FIG. 1 shows a highly schematic illustration of an imaging device 2 comprising a first optical unit 4, which is illustrated diagrammatically as a lens, and a second optical unit 6, which is likewise illustrated only diagrammatically as a lens for the sake of clarity. A third optical unit 8 is arranged between the first optical unit 4 and the second optical unit 6 and has an optical element configured as a first micro-optical lens array 10 and a second micro-optical lens array 12. The micro-optical lens arrays 10, 12 each comprise 256×256 lenses formed as converging lenses in the first lens array 10 and as diverging lenses in the second lens array 12. Each lens of the first lens array 10 is assigned to a lens of the second lens array 12. Moreover, the imaging device 2 comprises a detector, 14 having 256×256 detector cells, the boundaries of which relative to one another are indicated using horizontal lines in FIG. 1. Each detector cell is provided for taking up an image pixel. Each diverging lens of the second lens array 12 is assigned to a detector cell. The dimensions of the detector cells are in each case 40μ×40μ and those of the lenses of the lens arrays 10, 12 are in each case 100μ×100μ.

Figure 5:
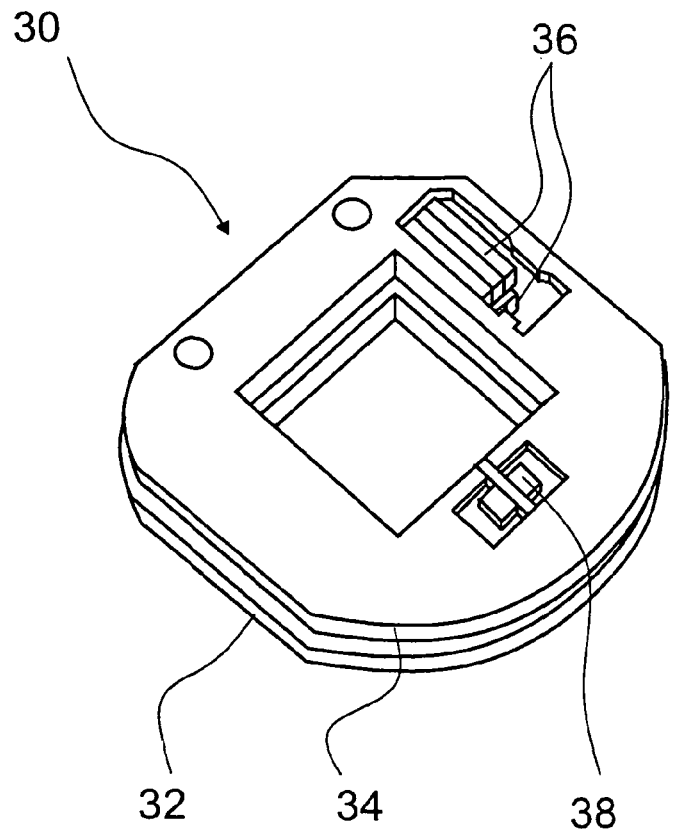
FIG. 5 shows a schematic illustration of a movement means for displacing an optical unit.

For the movement of the optical element 8 as a whole and of the lens arrays 10, 12 relative to one another, the imaging device 2 comprises a control unit 16, which controls a movement means 18 which is illustrated in greater detail in FIG. 5. By virtue of the movement means 18, the first and second lens arrays 10, 12 are mounted such that they are moveable in all three mutually perpendicular spatial directions x, y, z indicated by the arrows 20.

In the event of wobbling or tremor of the imaging device 2, a stationary point to be imaged, in the course of a certain time, is no longer imaged on one of the detector cells of the detector 14, but rather on a plurality of said cells. In this case, the imaging of the point migrates across the detector cells to an extent that corresponds to the wobbling. The same holds true in the case of a stationary imaging device 2 and a tremoring object to be imaged. In order to compensate for or at least counteract this wobbling movement or tremor movement of the imaging over the detector 14, the optical element 8 may be moved such that a resulting beam deflection is directed oppositely to the wobbling movement.

For this purpose, the wobbling movement of the imaging device 2, for example, may be registered with the aid of a suitable detection device, and corresponding control commands may be passed to the movement means 18 by the control unit 16. Such a detection unit may be for example a vibration measuring unit or an image processing device which detects an undesirable movement of a high-contrast imaging section from one detector cell to an adjacent detector cell and communicates corresponding signals to the control unit 16. A beam deflection or imaging shift for the purpose of image stabilization is explained by way of example below with reference to the illustration in FIG. 1.

The detection unit (not shown) has registered for example a wobbling movement which has led or, depending on the detection unit, would still lead to a shift in a point image upwards by one pixel. As a result of a corresponding signal from the control unit 16 to the movement means 18, the first lens array 10 is moved downwards by a distance $y_1$ in the negative y direction. In this case, the third optical unit 8 is already situated at an operating point 22 (FIG. 3) lying at a shift-out distance $x_1$ in the negative x direction away from the intermediate image plane 24. In this case, the shift-out is effected parallel to the optical axis of the first optical unit 4. As a result of the displacement of the first lens array 10 downwards by the displacement distance $y_1$, the beam path passing through the third optical unit 8 is deflected downwards, as a result of which the imaging of the point to be imaged is shifted downwards both in the intermediate image plane 24 and on the detector 14. In FIG. 1, the shift Y of the imaging onto the detector 14 downwards amounts to the shift distance $Y_1$, which corresponds to an edge length of a detector cell of the detector 14. In this way, the point to be imaged is imaged one detector cell further down than would be the case without the displacement of the first lens array 10. A wobbling movement of the imaging of the point to be imaged on the detector 14 upwards by one detector cell can be compensated for in this way.

Figure 2:
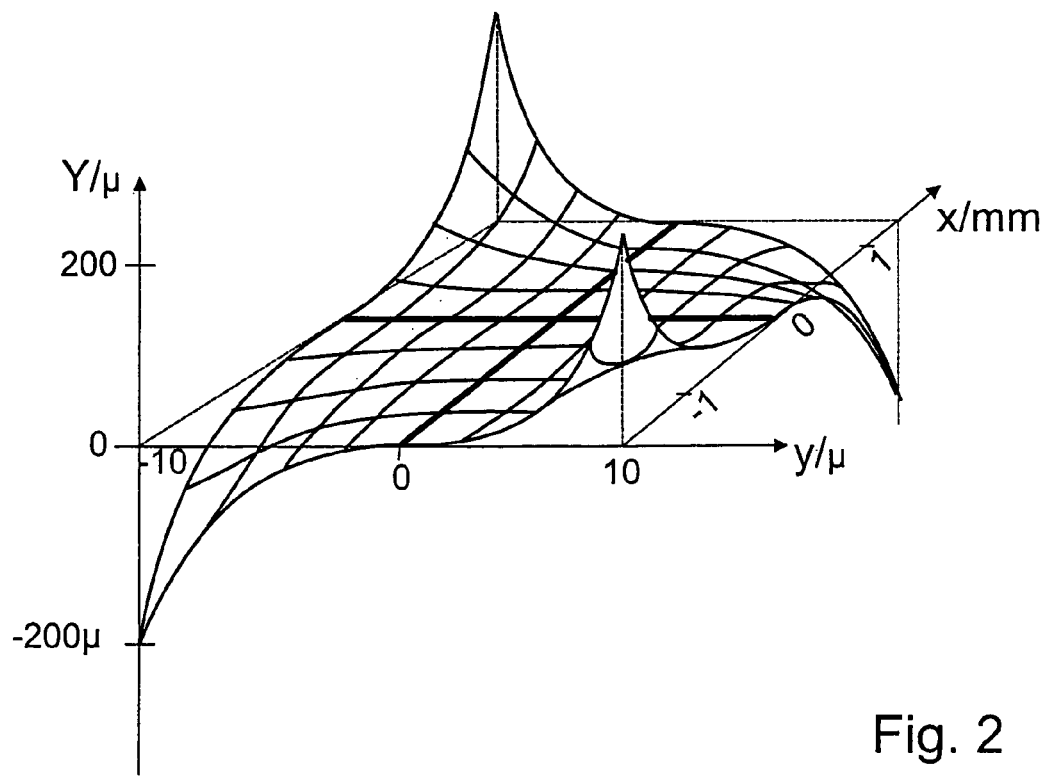
FIG. 2 shows a schematic diagram of a beam deflection on a detector versus a displacement of the optical unit mounted in moveable fashion.

The shift Y(x, y) of an imaging on the detector 14 is plotted in FIG. 2. The shift Y(x, y) is dependent on the shift-out x of the third optical unit 8 from the intermediate image plane 24 and the displacement y of the first lens array 10 with respect to the second lens array 12. In the case of no shift-out x, the shift Y in the case of a displacement y of the first lens array 10 with respect to the second lens array 12 moves along the zero axis (shown bold) in the x direction. No or as good as no shift Y can be registered on the said zero axis, since a shift of an imaging on the detector 14 is so small that it remains within a detector cell. Since a detector cell represents a pixel as the smallest unit of area that can be resolved, a shift within a pixel cannot be recorded or, if it involves movement from an edge region of one detector cell to the adjacent detector cell, can be recorded only with very great difficulty. Even a shift-out x of the third optical unit 8 out of the intermediate image plane 24 in the absence of a displacement y of the lens arrays 10, 12 relative to one another, leads to no shift Y.

Only a combination of shift-out x and displacement y leads to a shift Y in the manner such as is illustrated schematically in FIG. 2. A large shift Y over several hundred μm and thus over many detector cells of the detector 14 is achieved in the case of a shift-out x that is significantly greater than 1 mm and a displacement y of more than 10 μm. The shift Y in the y direction is used only by way of example in the figures. A shift Z in the z direction is achieved analogously and to the same extent as a shift Y by means of a displacement z of the lens arrays 10, 12 relative to one another in the z direction.

Figure 3:
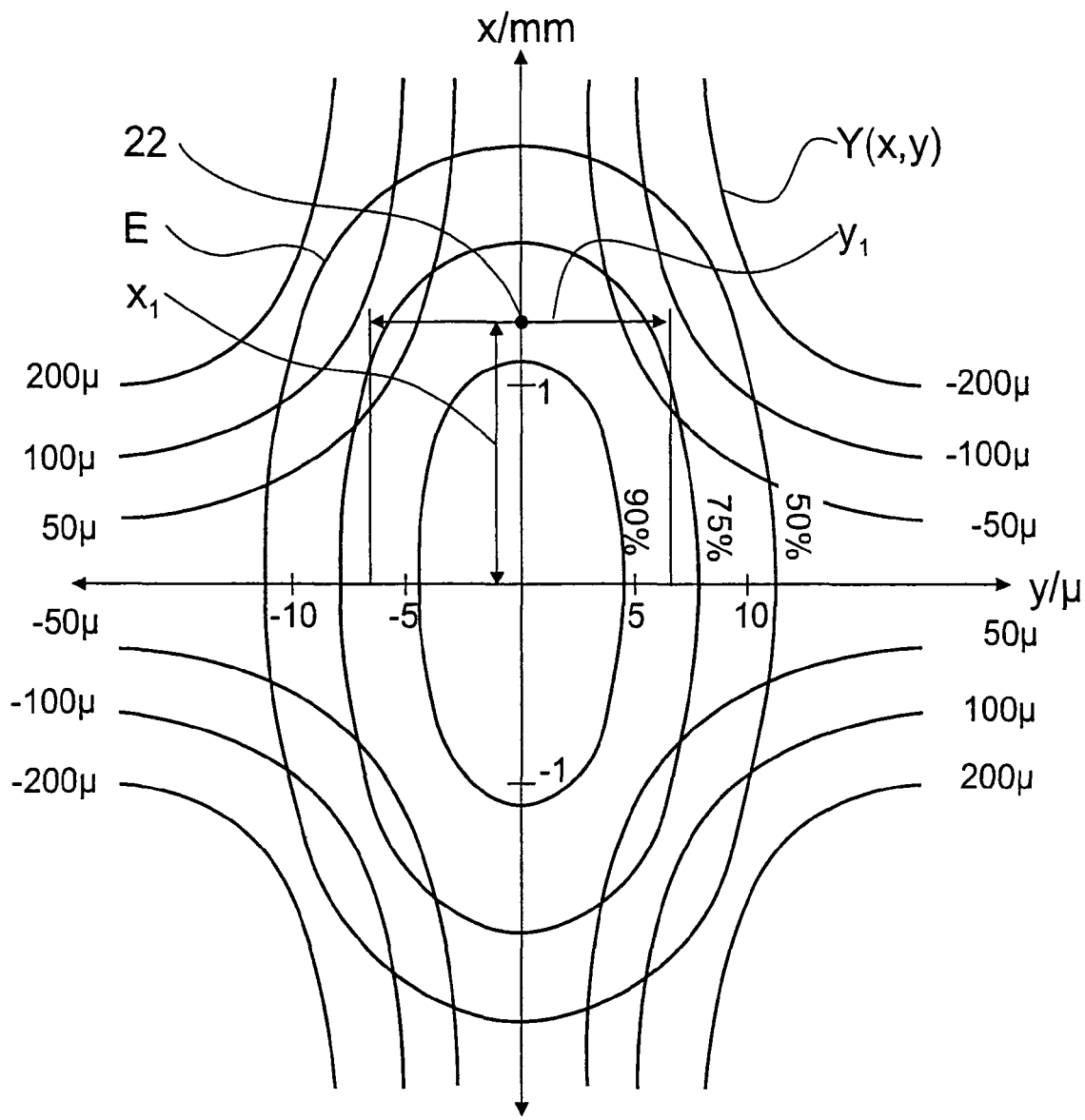
FIG. 3 shows a schematic diagram for determining an operating point.

In the diagram shown in FIG. 3, the shift Y (x, y) is plotted in the form of contour lines over a two-dimensional plane comprising shift-out x and displacement y. As shift-out x increases, associated with an increase in displacement y (or else z), the magnitude of the shift Y increases. The efficiency E is also plotted in the same diagram, that is to say over the same plane spanned by the shift-out x and the displacement y. The efficiency E represents the scattered-light losses and is the light intensity at the detector 14 divided by the light intensity in the absence of displacement y and shift-out x. The efficiency decreases both in the case of a large displacement y and in the case of a large shift-out x.

In order to bring about a stabilization of an imaging onto the detector 14, it is necessary to achieve a shift distance Y. The latter is achieved by means of a shift-out x of the third optical unit 8 associated with a displacement y of the lens arrays 10, 12 relative to one another. However, the efficiency, that is to say the light intensity that can be measured on the detector, decreases as displacement y increases or shift-out x increases, so that it is necessary to choose a suitable operating point 22 into which the third optical unit 8 is moved for the purpose of image stabilization. In FIG. 3, the operating point 22 is chosen such that the optical unit 8 is at the shift-out distance $x_1$ of around 1.3 mm in the direction of the first optical unit 4 away from the intermediate image plane 24. The shift-out distance $x_1$ results from the distance between the intermediate image plane 24 and a central plane between the lens arrays 10, 12, the said central plane resulting from the optical data of the lens arrays 10, 12.

Once shifted out into the operating point 22, the third optical unit 8 as a whole can rest, the shift Y of an imaging on the detector 14 being achieved by the displacement y of one of the lens arrays 10, 12 relative to the other. It can be seen from FIG. 3 that the maximum displacement distance $y_1$ is approximately 7 μm. With this maximum displacement distance $y_1$, it is possible to achieve a shift distance $Y_1$ of approximately ±80 μm, which corresponds to the size of two detector cells. It is thus possible to effectively counteract a wobbling of the imagings over ±2 detector cells, that is to say over a total of 4 detector cells. An efficiency E of at least approximately 70% is not undershot in this case. It is thus possible to achieve a high imaging stabilization in conjunction with a high efficiency E.

If the extent of an undesirable movement of an imaging onto the detector 14 that is caused by wobbling is small and, if appropriate, slow, then it is possible to choose an operating point 22 which lies in the region of 1 mm shift-out x. In the case of a shift-out x of 1.0 mm, for example, it is possible, in association with the displacement distance $y_1$, as depicted in FIG. 3, to achieve a shift Y over somewhat more than one detector cell, the efficiency not falling below 80%. The calculation of an operating point 22 that is as efficient as possible is performed by the control unit 16 using available information about the extent of the wobbling movement and a brightness of the imaging onto the detector 14. After a calculation of the operating point 22, the control unit 16 passes corresponding signals to the movement means 18 for moving the third optical unit 8 into the operating point 22.

Figure 4:
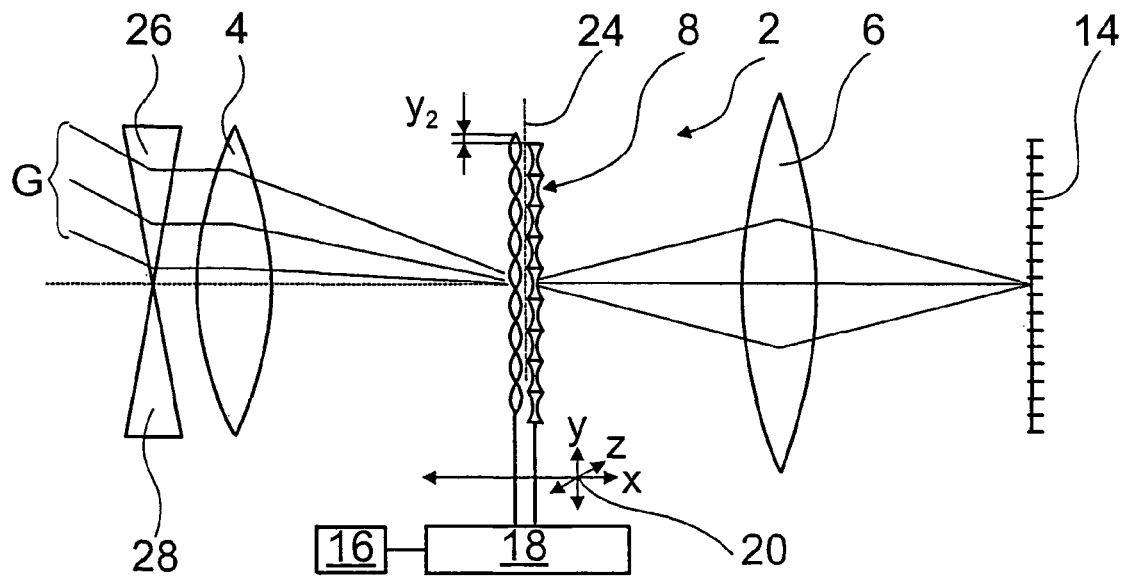
FIG. 4 shows a schematic illustration of an imaging device with selection of a field of view.

FIG. 4 shows a further aspect of the invention, namely the possibility of linking the imaging stabilization described above with selection of a field of view. For this purpose, a plurality of prisms are arranged upstream of the optical unit 4, two prisms 26, 28 of which are illustrated schematically. In the case of a corresponding discrete displacement distance $y_2$ of the lens arrays 10, 12 relative to one another, the beam path, as shown in FIG. 4, is deflected such that a first field of view G is imaged onto the detector 14. In the case of a displacement distance with negative $y_2$, that is to say a displacement of the first lens array 10 relative to the second lens array 12 shifted downwards, a field of view selected through the prism 28 would be imaged onto the detector 14. By means of a corresponding displacement distance $±z_2$, it is possible to select for example two further prisms (not shown), and thus two further fields of view, for imaging onto the detector 14. The dimensions of the optical units 4, 6, 8 may be chosen correspondingly depending on the selection of the field of view and a desired imaging stabilization. The said optical units 4, 6, 8 are not illustrated true to scale in FIGS. 1 and 4.

In order to achieve an imaging stabilization in the case of a field of view G as selected in FIG. 4, the displacement distance $y_1$ for image stabilization is superposed on the displacement distance $y_2$ for selection of the field of view. In this way, a very large viewing field comprised of a plurality of fields of view can be imaged onto the detector 14 with a high resolution and a high image stability.

A schematic illustration of an actuating unit or a movement means 30 for moving the third optical unit 8 is shown in FIG. 5. The movement means 30 comprises two frames 32, 34 of which the frame 32 encloses the first lens array 10 and the frame 34 encloses the second lens array 12. The lens arrays 10, 12 are not illustrated in FIG. 5 for the sake of clarity. The two lens arrays 10, 12 are mounted such that they are moveable within the frames 32, 34, so that they can be moved back and forth within the frames 32, 34 in each case by a piezo-actuating element 36. Each of the piezo-actuating elements 36 has stacks of piezoelements supported at the frames 32, 34. The stroke of the piezoelements is transmitted to the lens arrays 10, 12 by transmission and deflection mechanisms (not illustrated). In this case, the stroke of the stacks of piezoelements is only a few μm. The displacement y of the lens arrays 10 relative to the frames 32, 34 is measured by means of a capacitive displacement sensor 38. The displacement sensor 38 and the piezo-actuating elements 36 form measurement sensor and actuator of a control loop (not illustrated) by means of which the adjusting travel of the lens arrays 10, 12 can be regulated to a predetermined value.

While a displacement in the y direction and z direction is achieved by the piezo-actuating elements 36, a shift-out x of the lens arrays 10, 12 is achieved by a finely adjustable electric linear motor (not shown) in the movement means 18. The said electric linear motor moves the two frames 32, 34 within the movement means 18 in the x direction.

| Reference symbols | |
|---|---|
| 2 | imaging device |
| 4 | optical unit |
| 6 | optical unit |
| 8 | optical unit |
| 10 | lens array |
| 12 | lens array |
| 14 | detector |
| 16 | control unit |
| 18 | movement means |
| 20 | arrow |
| 22 | operating point |
| 24 | intermediate image plane |
| 26 | prism |
| 28 | prism |
| 30 | movement means |
| 32 | frame |
| 34 | frame |
| 36 | piezo-actuating element |
| 38 | displacement sensor |
| x | shift-out |
| y | displacement |
| z | displacement |
| Y | shift |
| E | efficiency |
| G | field of view |

The invention claimed is:

1. Imaging device (2) for the stabilized imaging of an object onto a detector (14) with a first optical unit (4) and a second optical unit (6) and an optical element that is arranged between the optical units (4, 6) and is movable for the purpose of stabilizing the imaging on the detector (14), wherein the optical element is a micro-optical lens array (10), and the lens array (10) is moveable relative to a second lens array (12), the lenses of which are in each case assigned to a number N of detector pixels.

2. Imaging device (2) according to claim 1, wherein the optical element is movable with the aid of an electronic control unit (16).

3. Imaging device (2) according to claim 2, wherein a movement means (18) is driven with the aid of the electronic control unit (16) to facilitate the defined movement of the optical element out of an intermediate image plane (24) provided by the first optical unit (4).

4. Imaging device (2) according to claim 3, wherein the movement means (18) is provided for effectuating a movement of the optical element in parallel along an optical axis of the first optical unit (4).

5. Imaging device (2) according to claim 1, wherein an electronic control unit (16) is provided for calculating an operating point (22) of the optical element outside an intermediate image plane (24).

6. Imaging device (2) according to claim 5, wherein the control unit (16) is provided for calculating said operating point (22) from the extent of a wobbling movement of the imaging over the detector (14).

7. Imaging device (2) according to claim 5 or 6, wherein the control unit (16) is provided for controlling movement of the optical element into the operating point (22).

8. Imaging device (2) according to claim 5, wherein the control unit (16) is provided for including a brightness of the imaging in the calculation of the operating point (22).

9. Imaging device (2) for the stabilized imaging of an object onto a detector (14) with a first optical unit (4) and a second optical unit (6) and an optical element that is arranged between the optical units (4, 6) and is movable for the purpose of stabilizing the imaging on the detector (14), wherein the optical element is a micro-optical lens array (10), the optical element being movable with the aid of an electronic control unit (16), and a movement means (18), which is driven with the aid of the control unit (16) facilitating the defined movement and shifting out of the optical element from an intermediate image plane (24) provided by the first optical unit (4), the movement means (18) being provided for effectuating a movement of the optical element in parallel along an optical axis of the first optical unit (4); and wherein the lens array (10) is movable relative to a second lens array (12) the lenses of which are in each case assigned to a number N of detector pixels.

10. Imaging device (2) according to claim 9, wherein the control unit (16) is provided for calculating an operating point (22) of the optical element outside the intermediate image plane (24).

11. Imaging device (2) according to claim 10, wherein the control unit (16) is provided for calculating said operating point (22) from the extent of a wobbling movement of the imaging over the detector (14).

12. Imaging device (2) according to claim 10 or 11, wherein the control unit (16) is provided for controlling the movement of the optical element into the operating point (22).

13. Imaging device (2) according to claim 10, wherein the control unit (16) is provided for including a brightness of the imaging in the calculation of the operating point (22).

* * * * *